United States Patent [19]

Knowles

[11] Patent Number: 4,962,980

[45] Date of Patent: Oct. 16, 1990

[54] LASER SCANNER ENGINE WITH FOLDED BEAM PATH

[75] Inventor: Carl H. Knowles, Moorestown, N.J.

[73] Assignee: Metrologic Instruments, Inc., Bellmawr, N.J.

[21] Appl. No.: 299,998

[22] Filed: Jan. 23, 1989

[51] Int. Cl.$^5$ .................... G02B 26/10; G06K 7/10
[52] U.S. Cl. .................... 350/6.6; 350/622; 235/467
[58] Field of Search ............... 350/6.5, 6.6, 618, 622; 235/462, 467, 472

[56] References Cited

U.S. PATENT DOCUMENTS

| | | | |
|---|---|---|---|
| D. 281,977 | 12/1985 | Sklaroff | D14/116 |
| 4,349,843 | 9/1982 | Lackmann et al. | 350/6.6 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,575,625 | 3/1986 | Knowles | 235/467 |
| 4,607,156 | 8/1986 | Koppenaal et al. | 235/472 |
| 4,713,532 | 12/1987 | Knowles | 235/467 |
| 4,760,248 | 7/1988 | Swartz et al. | 235/472 |
| 4,762,994 | 8/1988 | Byerly et al. | 350/6.8 |

Primary Examiner—Bruce Y. Arnold
Assistant Examiner—Ronald M. Kachmark
Attorney, Agent, or Firm—Caesar, Rivise, Bernstein, Cohen & Pokotilow, Ltd.

[57] ABSTRACT

A scanner module for use in a laser scanning system. The module is self contained within a housing having a window, and comprises a source of laser light, a mechanism for sweeping the laser beam within the housing to produce a scan pattern comprising at least one line, a reflective beam folding system for projecting the pattern out of the window and onto an object, such as a bar code, and a system for receiving light reflected off the object to convert the reflectd light into an electrical signal indicative thereof. The beam sweeping mechanism comprises an oscillating reflective member. The reflective beam folding system comprises at least two mirrors disposed generally opposite each other to receive the beam of light from the beam sweeping mechanism and to fold its path by reflecting it back and forth within the housing. The module may be connected to a handle or some other member, e.g., a data terminal, including a control system for actuating the module and for decoding the electrical signal provided by the module.

52 Claims, 6 Drawing Sheets

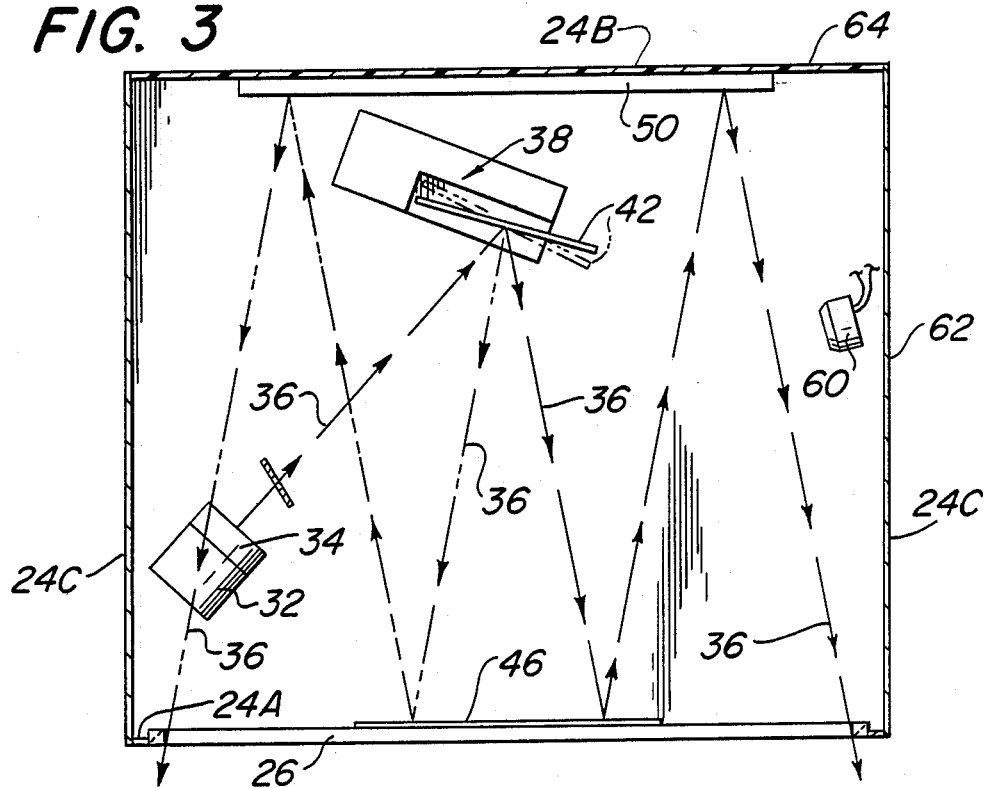
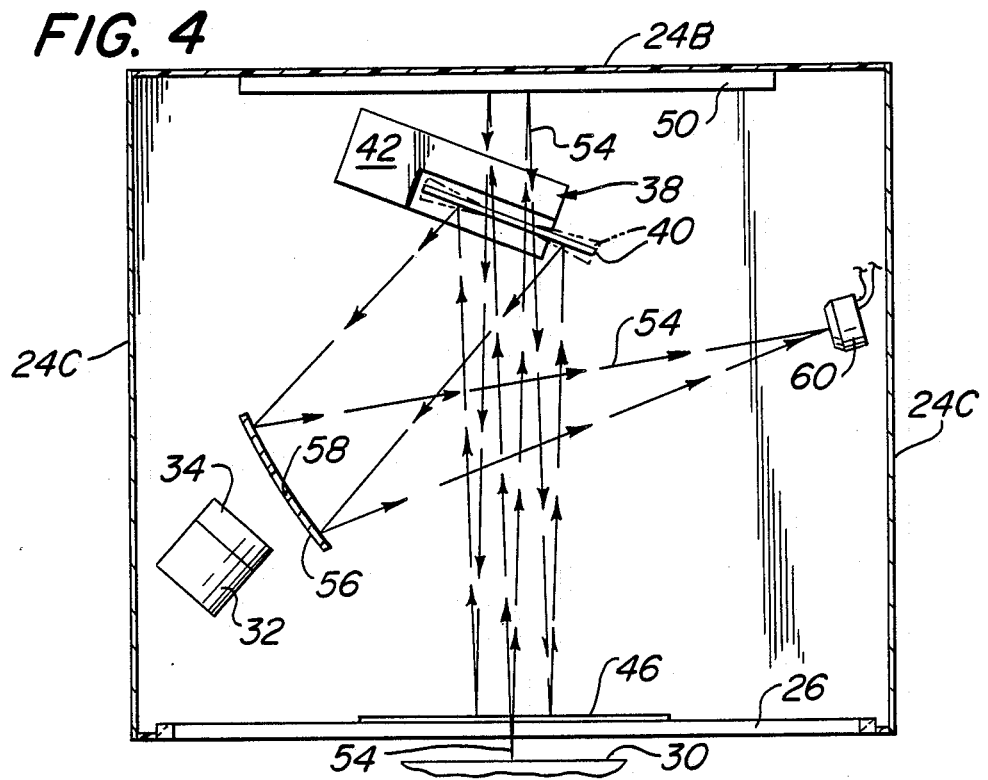

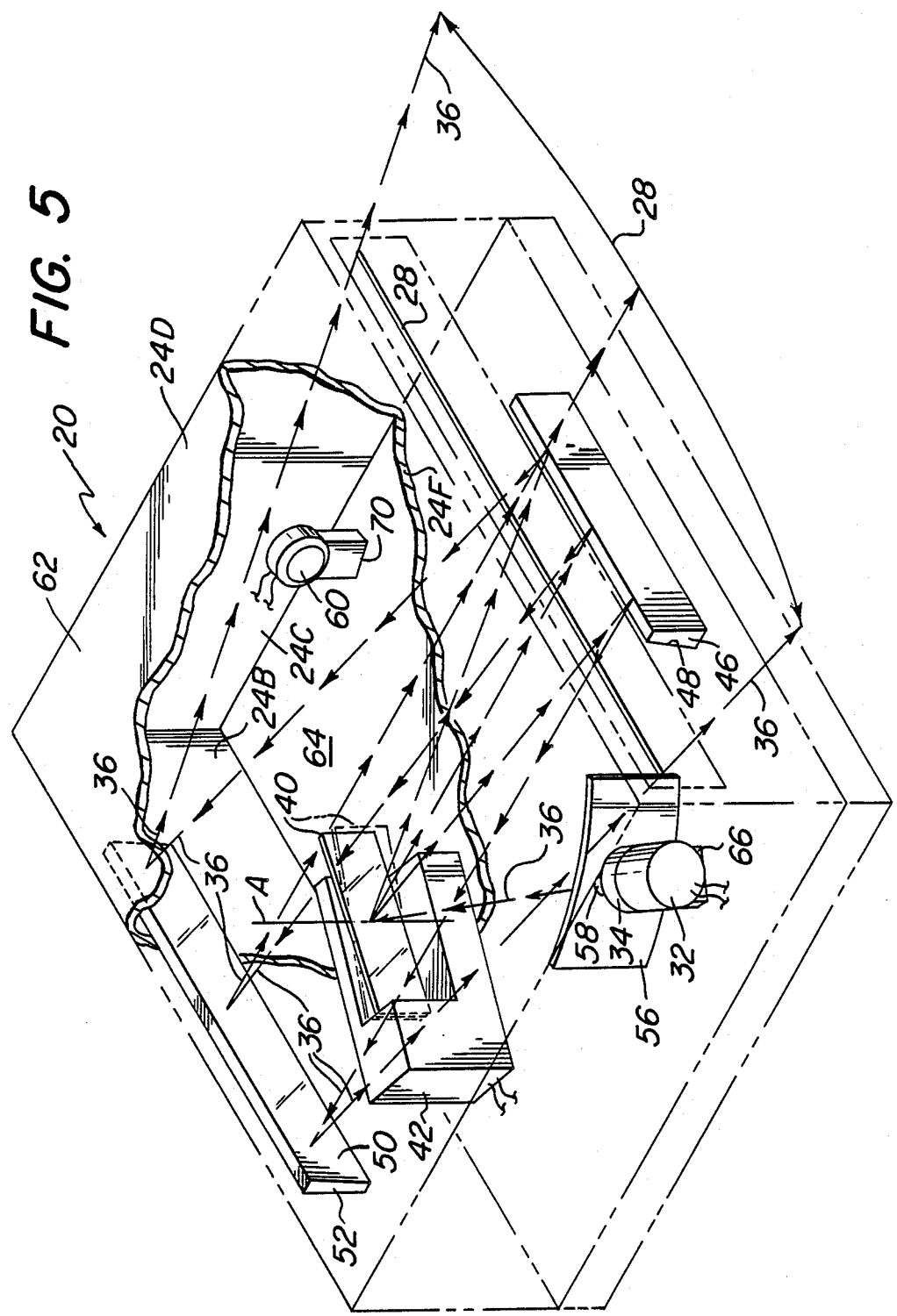

LASER SCANNER ENGINE WITH FOLDED BEAM PATH

BACKGROUND OF THE INVENTION

This invention relates generally to laser scanning apparatus and more particularly to compact, self-contained laser scanning modules for use in various type of laser scanning systems.

Various laser-based scanning systems have been disclosed in the patent literature and many are commercially available to read bar codes, e.g., the uniform product code, which is imprinted on packaging for product, or on the product itself, or on some other item.

One type of scanning system is referred to as a counter or "slot scanner". Such devices are generally mounted within a housing in a checkout counter of a supermarket or other retail establishment, and include a window at the top thereof through which a scanning pattern is projected. The scanning pattern is created by a laser and associated optical components, e.g., mirrors, etc. which typically produce plural scan lines which are either parallel to one another and/or intersect one another. When an item bearing a bar code is brought into the field of the scan pattern so that the pattern traverses the bar code light is reflected off of the bar code and is received back through the window of the slot scanner, whereupon decoding means converts the received light into an electrical signal indicative of the bar code. These signals can then be utilized to identify the article bearing the code and provide pricing information.

In order to ensure that a bar code is traversed sufficiently so that it can be read accurately irrespective of its orientation within the scan pattern, prior art counter scanners have utilized various optical configurations including mirrors, prisms, and the like to fold the laser beam and create complex patterns. Examples of such patterns are comb patterns, orthogonal patterns, interlaced patterns, star-like patterns, etc. While such patterns may be suitable for their purposes, the means for creating them has resulted in housings which were quite large in size.

In my U.S. Pat. No. 4,713,532 there is disclosed a counter scanner producing a pattern having at least three intersecting scan lines forming a large "sweet spot" to enable the bar code to be read irrespective of its orientation with respect to the scanner. That scanner is housed within a very compact, small footprint housing, e.g., a housing taking up an area no greater than approximately one hundred and fifty square inches of counter space and having a height of less than six inches. Notwithstanding the compact features of that scanner, it is obviously still too large and heavy to be utilized in a hand-held scanning system.

Hand-held scanning devices commonly make use of a lightweight and compact scanning head which is arranged to be held within the user's hand. The head, when actuated by the user projects a laser beam pattern out of a window in the head onto a bar code located opposite the window. In U.S. Pat. No. 4,575,625, of which I am the inventor, and which is assigned to the same assignee as this invention, there is disclosed one such a self-contained hand-held laser scanner. That scanner's head includes the bar code scanning means, power supplies, a decoding computer and communication capabilities to enable the uploading/downloading of data to and from the scanner, all located within a molded plastic body or housing. In particular the housing includes a laser tube which produces a laser beam and directs it to a rotating reflective polygon. The polygon is rotated by an associated motor assembly. The laser beam is swept by the rotating polygon through a predetermined arc and is directed out through a window in the housing to sweep across a bar code located opposite the window. A photo detector located within the housing receives the light reflected off of the bar code and converts that light into an electrical signal which is amplified and processed by an associated amplifier and signal processing circuitry, also located within the housing. A low voltage power supply, a microprocessor and associated circuitry, a high voltage power supply, a releasable input/output cable connector or plug, an associated input/output cable, and an on/off trigger assembly complete the scanner and are also located within the housing. The shape of the housing is shown in U.S. Des. Pat. No. D281,977, also assigned to the same assignee as this invention.

In my co-pending U.S. patent application Ser. No. 07/128,299, filed on Dec. 3, 1987, now U.S. Pat. No. 4,805,175, entitled Ultra Compact, Hand-Held Laser Scanner, which is assigned to the same assignee as this invention, there is disclosed an even more compact hand-held scanner. That scanner basically comprises a laser tube and associated high voltage power assembly, beam folding and sweeping optics and a motor sub-assembly, a photo detector and associated amplification and signal processing circuit sub-assembly, a releasable input/output cable connector or plug, an associated input/output cable, and on/off trigger assembly, all housed within an extremely compact and ergonomically designed housing. The housing includes a short snout or body portion in which a window, through which the laser beam and the reflected light passes, and a supporting, hand-grip portion arranged to be held within the user's hand. The housing's construction enhances the balance point of the scanner by putting its center of gravity in the operator's hands so that it can be held comfortably for long periods of time, without operator fatigue.

In the interest of compactness the device of my co-pending application makes use of an oscillating mirror to effect the scanning or sweeping action of the beam. Thus, in that scanner the laser beam is directed to an oscillating mirror to sweep the beam through a predetermined arc, with the swept beam being directed straight from the mirror through the short snout body portion of the housing and out through the window to impinge on a bar code disposed opposite the window.

Examples of other hand-held laser scanners have been disclosed in the following patent literature: U.S. Pat. Nos. 4,387,297 (Swartz et al.), 4,409,470 (Shepard et al.), 4,460,120 (Shepard et al.), 4,607,156 (Koppenall et al.) and 4,760,248 (Swartz et al).

While the devices disclosed in the aforementioned prior art all exhibit the characteristic of being compact to some degree in the interest of operator ease of use, nevertheless all still leave something to be desired from the standpoint of size.

As will be appreciated by those skilled in the art, if the angle through which the beam is swept is small, the linear velocity of the beam when traversing a symbol located close, e.g., 1 inch, to the beam sweeping mechanism (e.g., mirror) will not vary so greatly from the linear velocity of the beam when traversing a symbol located far, e.g., 10 inches, therefrom that the signal processing and decoding components can readily compensate for such speed differences. Where, however, a large beam sweep angle is utilized (such that the scanning of large, close-in, symbols can be readily effected) there will be a great difference in the linear beam speed when scanning up close and far out symbols. Thus, the task of signal processing and decoding the light reflected off of small (narrow) symbols located far from the scanner becomes considerably more difficult.

Placing the outgoing beam window closely confronting the beam sweeping mirror, like that done in U.S. Pat. No. 4,409,470 (Swartz, et al.) so that the beam passes over the barrel portion of the housing and is not constrained thereby, results in a large scanner housing (i.e., its barrel portion is of substantial length). Placing the outgoing mirror closely confronting the beam sweeping mirror, like that done in the U.S. Pat. No. 4,760,248 (Swartz, et al.), enables the use of a compact scanner housing. However, that construction is inconsistent with the production of a wide-beam length scan pattern closely adjacent the window using a small beam sweep angle, such as would be necessary to obviate the scan velocity problems inherent in scanning small symbols at great distances, as described above.

Accordingly, the need presently exists for a scanner which can produce a narrow beam sweep angle consistent with the scanning of small symbols at large distances, while enabling the beam to be of sufficient width up close to the window consistent with the decoding of large symbols located thereat, yet all located within a very compact housing.

Moreover, a need presently exists for providing a self-contained scanning device which is very compact in size and light in weight and which can serve as a module or basic building block (an "engine") for incorporation into either a hand-held laser scanning system or other types of laser scanning systems.

OBJECTS OF THE INVENTION

Accordingly, it is a general object of this invention to overcome the disadvantages of the prior art.

It is a further object of this invention to provide an extremely compact, modular scanning unit which overcomes the disadvantages of the prior art.

It is still a further object of the instant invention to provide a modular scanning unit which is very small in size yet which is capable of producing a laser scanning pattern comprising a line whose sweep angle is sufficiently small to expedite the reading of small symbols located relatively far from the scanner while having sufficient beam width to facilitate the scanning of large symbols located close to said scanner.

SUMMARY OF THE INVENTION

These and other objects of the instant invention are achieved by providing a laser scanning module for use in a scanning system. The module comprises a housing having a window, first means for sweeping a laser beam from a predetermined point within the housing through a predetermined angle to produce a scan pattern comprising at least one line, and second means for projecting the scan pattern out of the window. The length of the line of the scan pattern at the window is predetermined. The second means is located between the first means and the window and comprises beam folding means for folding the path of the beam within the housing so that the predetermined point may be located closer to the window than if the beam were projected directly through the predetermined angle from some point to the window to produce a scan line of the predetermined length at the window, thereby enabling the housing to be very compact, while enabling the ready scanning of symbols located close to and far away from the window.

DESCRIPTION OF THE DRAWING

FIG. 3 is an enlarged sectional view taken along line 3—3 of FIG. 2 and showing the production of the outgoing line pattern;

FIG. 4 is a view, similar to that of FIG. 3, but showing the light reflected off the symbol as received and collected by the scanner of FIG. 1;

FIG. 5 is an enlarged perspective view, partially in section, showing the production of the outgoing line pattern beam;

DETAILED DESCRIPTION OF THE PREFERRED EMBODIMENT

Figure 1:
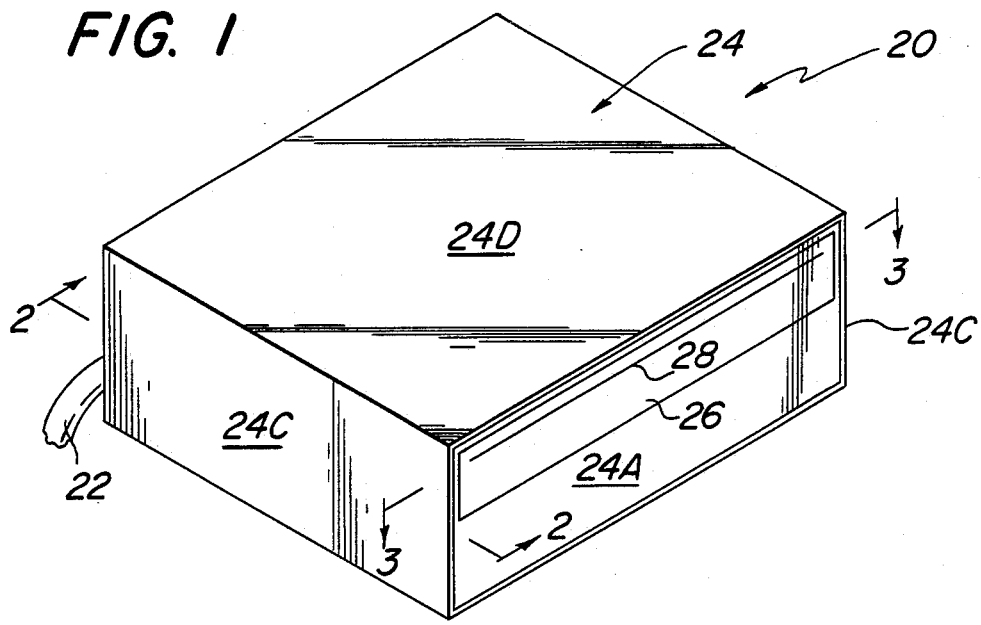
FIG. 1 is a perspective view of one embodiment of a modular scanning component constructed in accordance with the subject invention.

Referring now to various figures of the drawing wherein like reference characters refer to like parts there is shown in FIG. 1 one embodiment 20 of a modular scanner or "engine" constructed in accordance with this invention. The engine 20 is a complete scanning unit which is arranged to be connected to any suitable decoder and/or other apparatus to form any type of scanning system (not shown). Thus, in accordance with a preferred embodiment of this invention the engine 20 is arranged to provide digital output signals indicative of the bars and spaces in a bar code (or other symbol) for use by any suitable decoder in the scanning system. The digital output signals are provided to the decoder via a cable 22. That cable also serves to carry the input signals and power to the engine 20.

As can be seen in FIG. 1 the engine 20 is self-contained within a very compact, e.g., 1 inch by 1.5 inches by 0.75 inch, parallelopiped shaped housing 24. The housing includes a front wall 24A, a rear wall 24B, a pair of side walls 24C, a top wall 24D and a bottom wall 24E. The front wall includes a rectangularly shaped window 26 extending virtually the entire width of the housing and located immediately adjacent the top wall 24D.

The laser light source and all of the associated optical, mechanical, and electrical components to produce a laser beam scan pattern 28, to project it out of the window 26 onto a bar code 30 (FIG. 6), and to sense the light reflected off of the bar code to produce the digital output signals, are all located within the housing 24.

The components forming the laser, its focusing optics, and the electrical components forming the reflected light receiving means and associated signal processing circuitry are conventional, and hence, will only be described generally herein. Thus, as can be seen in FIGS. 2-6 the engine comprises a conventional semiconductor laser diode 32 and associated optical means 34. The optical means 34 comprises a lens system, not shown, mounted on the front of the laser diode for focusing the beam produced by the diode into the desired spot size. As is known by those skilled in the art, the higher the degree of convergence of a laser beam, the higher its resolution but the narrower the depth of field. In the preferred embodiment disclosed herein the beam from the semiconductor laser diode is focused by the optical means 34 such that the beam's converging angle is on the order of 1/200ths to 1/300ths of a radian. This will produce, for typical bar codes, the optimum combination of depth of field and resolution.

The focused beam 36 (FIG. 3) is directed to beam sweeping means 38. That means sweeps the focused beam through a predetermined arc, about an axis 40 (FIG. 5) to produce the scan pattern 28. In accordance with a preferred embodiment of this invention the scan pattern 28 consists of a single, straight line when projected onto a plane.

As can be seen in FIGS. 1, 3 and 5, the linear pattern 28 extends across substantially the entire width of the window 26 and exits the window immediately below the top wall 24D. The latter feature facilitates the aiming of the pattern onto a bar code when the engine 20 is incorporated into a hand-held laser scanner (not shown). One such hand-held scanner is disclosed and claimed in my copending U.S. patent application Ser. No. 07/303,376, filed Jan. 26, 1989, entitled Portable Laser Scanner' with Integral Scanner Engine, assigned to the same assignee as this invention, and its disclosure is incorporated by reference herein.

The beam sweeping means 38 constitutes another invention of mine, is the subject of copending U.S. patent application Ser. No. 07/300,018, filed on Jan. 23, 1989, entitled Bouncing Oscillating Scanning Device for Laser Scanning apparatus, assigned to the same assignee as this invention and whose disclosure is incorporated by reference herein. As disclosed in that application the beam sweeping means basically comprises light reflective means 40 (e.g., a mirror), a motor (not shown), and a support structure 42.

The motor is preferably an electromagnet which is coupled to the mirror 40 to oscillate the mirror about an axis A through a predetermined arc, e.g., ±7 degrees, to produce the desired line pattern 28. In the preferred embodiment the mirror is concave, but can be any other suitable shape, e.g., planar. The mirror 40 is mounted on a pivot arm (not shown) which is pivotally mounted on the structure 42 at the location of the axis A. The pivot arm includes a permanent magnet mounted at its free end. The electromagnet motor comprises an coil of electrically conductive wire forming a central bore in which the permanent magnet is located. The coil is arranged to be connected to current supply means (not shown) for providing electrical current pulses of opposite polarity to it to produce alternating direction electromagnetic fields. This action causes the magnet to be pulled and pushed into and out of the bore, thereby causing the arm to oscillate about axis A.

The amount of excursion of the magnet into and out of the bore, and hence the angle of the mirror's oscillation about axis A, is established by the use of a pair of adjustable elastic stops or bumpers (not shown). In order to energize the coil a series of respective very short duration current initiation pulses are produced by control means (not shown) each time that the pivot arm has reached the end of its particular excursion. Sensor means (not shown) are provided at each bumper and are coupled to the control means to initiate the production of the current initiation pulses.

The alternate energization of the coil coupled with the operation of the elastic bumpers (e.g., the bumpers stop the excursion of the arm in one direction and due to their resiliency impart a force to the arm in the opposite direction) results in the controlled oscillation of the mirror. By controlling or adjusting the pulse width and/or magnitude of the current pulses provided to the motor one can control or adjust the velocity of the movement of the mirror 40.

Figure 2:
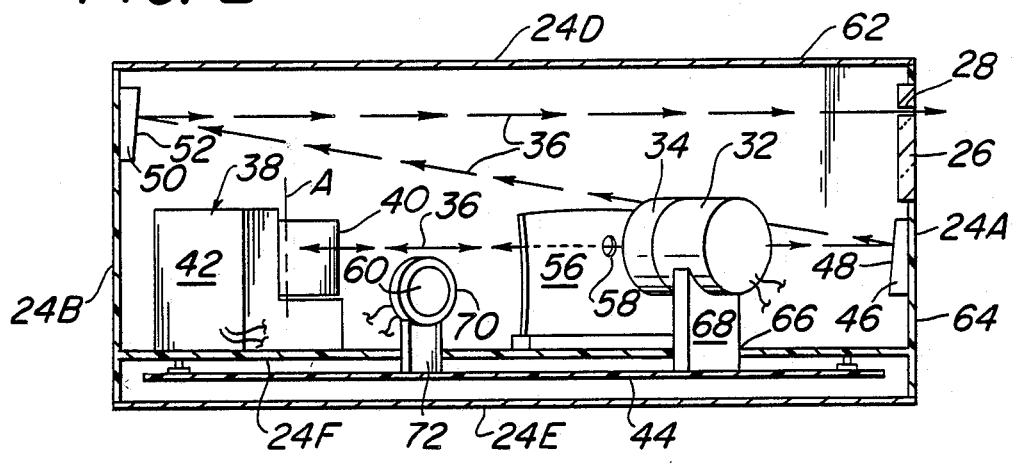
FIG. 2 is an enlarged sectional view taken along line 2—2 of FIG. 1.

The beam sweeping means 38 is mounted on a wall portion of the housing 22 (to be described later) at the same elevation as the laser diode 32 and associated focusing means 34 so that the focused beam 36 is projected horizontally onto the mirror 40 (see FIG. 2). The means for mounting the laser diode 32 and associated focusing means 34 comprises a printed circuit card 44 (to be described later) which is mounted within the bottom portion of the housing 22.

In accordance with a primary feature of this invention, the engine 20 includes a beam folding system located downstream of the beam sweeping means 38 to fold the path of the beam within the housing. In so doing the housing can be made very compact in size, as described earlier, while enabling the production of a wide, linear, scan pattern which can be used to scan large (wide) bar codes located close to the window as well as small (narrow) bar codes located far from the window, all without the need for complex signal processing and/or decoding means.

Figure 6:
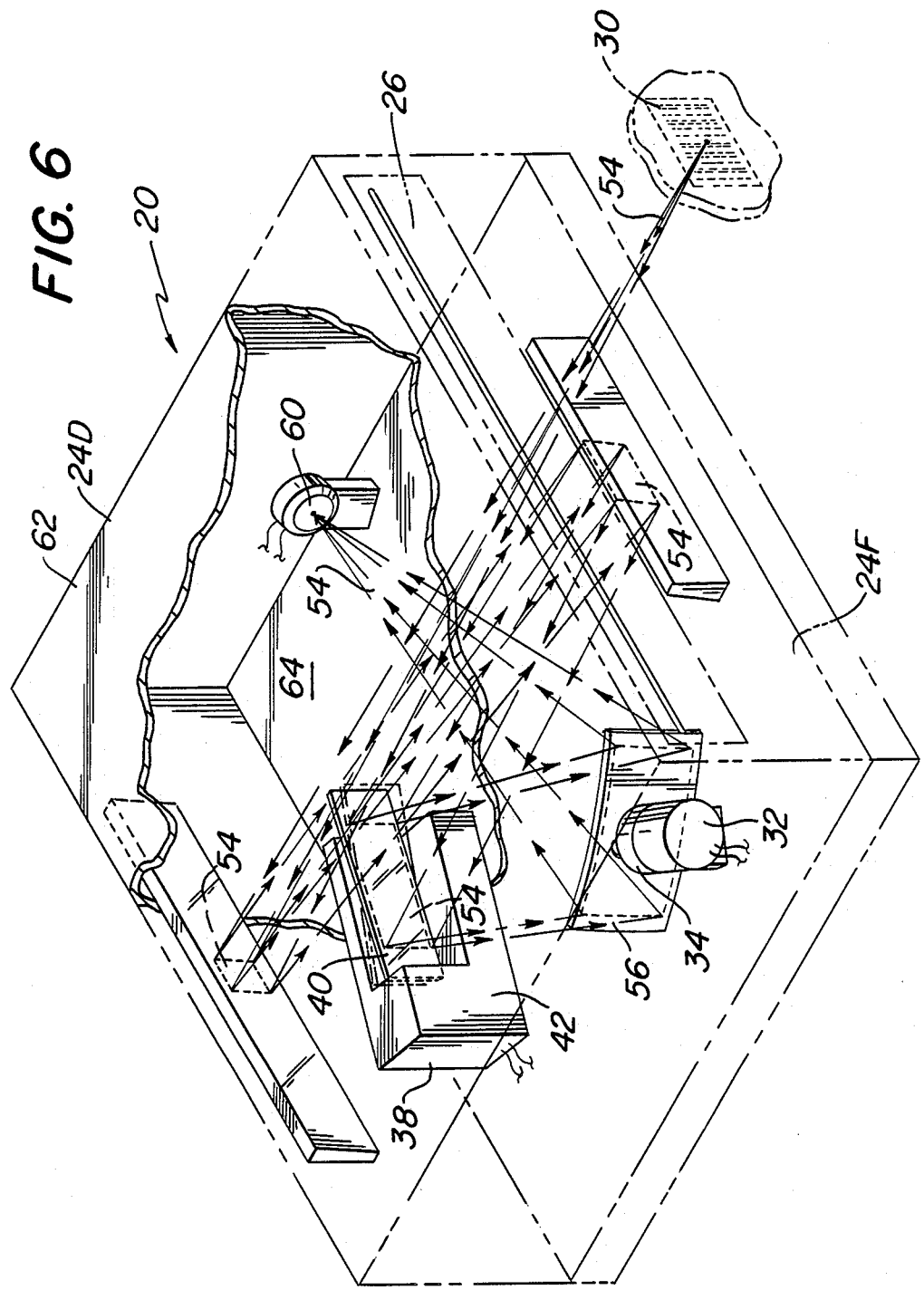
FIG. 6 is an enlarged perspective view, partially in section and similar to that shown in FIG. 5 and showing the path of light reflected from the symbol.

To accomplish that end the beam folding system of the embodiment 20 of FIG. 1 basically comprises a pair of reflecting surfaces, each in the form of an elongate mirror. In particular, a first mirror 46 is mounted on the interior surface of the housing's front wall 24A at the same elevation as the oscillating mirror 40. The mirror 46 extends a substantial portion of the width of the front wall (see FIGS. 3-5) and includes a planar reflecting surface 48 tilted upward at a slight acute angle, e.g., 4.8 degrees. Accordingly, the focused beam 36 is swept horizontally through the housing from an origin point (the point at which the focused beam impinges the oscillating mirror 40) to the upwardly angled reflecting surface 48 of the first mirror 46. As shown clearly in FIGS. 3 and 5 the mirror 46 then reflects the swept beam (the line forming pattern 28) to a second mirror 50 of the beam folding system. The mirror 50 is mounted on the inner surface of the housing's rear wall 24B at the same elevation as the window 26. The mirror 50 extends an even greater portion of the width of the housing than mirror 46 (see FIGS. 3-5) and includes a planar reflecting surface 52 which is tilted downward at a slight acute angle, e.g., 4.8 degrees. Accordingly, the mirror 50 reflects the swept beam received from the mirror 46 horizontally through the housing to the window 26, from which it exits to sweep across a bar code 30 (FIG. 6).

As will be appreciated by those skilled in the art the angle of reflectance of the beam 36 off the mirror is the same as its angle of incidence. Accordingly, as shown clearly in FIG. 3 the path of the swept beam is folded back and forth through the housing, that is the length of the path of the beam from its origin point on oscillating mirror 40 to the window is compressed or compacted. This action enables the line pattern 28 to take up virtually the entire width of the window 26 using a beam sweep angle which would have otherwise necessitated the location of the oscillating mirror 42 more than twice as far behind the window if the beam 36 was directed directly (linearly) from the oscillating mirror 40 to the window. Thus, the housing can be made much shorter than otherwise possible.

The traversal of the laser beam across the bar code symbol illuminates the symbol, whereupon light is reflected omnidirectionally off of the symbol. As shown in FIGS. 4 and 6 a portion of the reflected (spectral) light, representative of the bars and spaces of the code, and designated by the reference numeral 54 enters the window 26. The received light passes through the housing onto mirror 50 where it is reflected downward across the housing to mirror 46. Mirror 46 in turn reflects the incoming light 54 horizontally to the oscillating mirror 40, from whence it is directed horizontally to a collecting mirror 56. The collecting mirror 56 is mounted on a portion the housing (to be described later) directly in front of the laser beam focusing means 34. Thus, the collecting mirror includes an opening 58 (FIG. 2) through which the focused laser beam 36 passes enroute to the beam sweeping mirror 40.

The collecting mirror 56 basically comprises a concave, e.g., spherical, parabolic, etc., reflective surface for focusing the received light 54 onto a conventional light-to-electrical signal transducer, e.g., a phototransistor, 60. The phototransistor 60 is mounted on the circuit board 44 in the housing opposite to the collecting mirror 56. Accordingly, light received by the phototransistor is converted into an electrical signal indicative of the bars and spaces of the symbol scanned. The phototransistor is coupled to conventional signal processing means (not shown) including a preamplifier, amplifier, and digitizer circuitry mounted on the circuit board 44. That circuitry produces the heretofore mentioned digital output signals.

Figure 11:
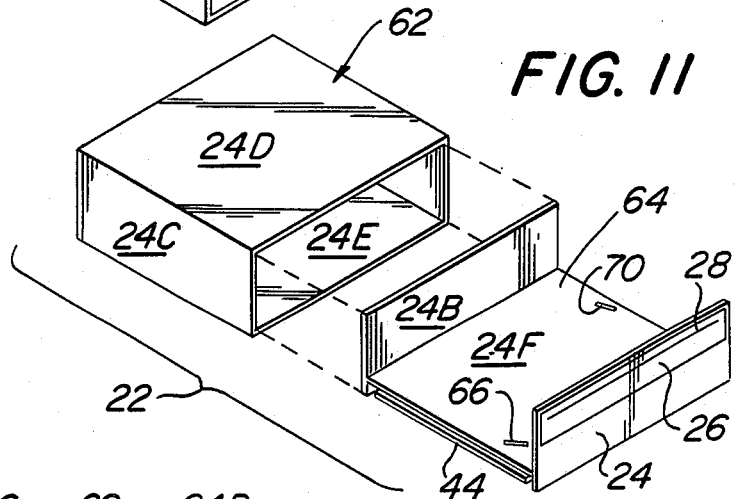
FIG. 11 is a reduced perspective view of the housing for the embodiment of the invention shown in FIG. 1

Referring to FIG. 11 the details of the housing 22 can be seen. Thus, the housing 22 is formed of two members which are arranged to be connected to each other. One member comprises a rectangular tube-like shell 62, which forms the heretofore identified side walls 24C, top wall 24D and bottom wall 24E. The other member is a generally H-shaped member 64 forming the heretofore identified front wall 24A and rear wall 24B. In addition, that member includes an interconnecting base wall 24F. In accordance with a preferred embodiment of this invention the member 64 is molded as an integral unit of any suitable material, e.g., plastic, while the sleeve 62 is preferably formed of a metal (in the interests of electric field isolation).

As can be seen clearly in FIG. 2 the circuit board 44 is mounted immediately below the base wall 22F of the member 64 via conventional mounting means, e.g., plural standoffs. The base wall 22F of member 64 includes an opening or slot 66 through which a mount 68 for the laser diode 34 extends. The mount 68 is fixedly secured onto the circuit board 44. The base wall 22F includes a second opening or slot 70 through which a mount 72 for the phototransistor 70 extends. The mount 72 is also fixedly secured onto the circuit board 44. The two members 62 and 64 are secured together to complete the housing 22 by sliding the H-shaped member 64 into the sleeve member 62 until the front wall 24A and rear wall 24B are flush with the front and rear ends of the sleeve member 62. This construction results in the creation of a housing having two isolated chambers, namely, an upper chamber in which the laser and the associated optical and motor components are located, and a lower chamber in which the circuit board 44 and its associated electrical and electronic components are located.

Figure 7:
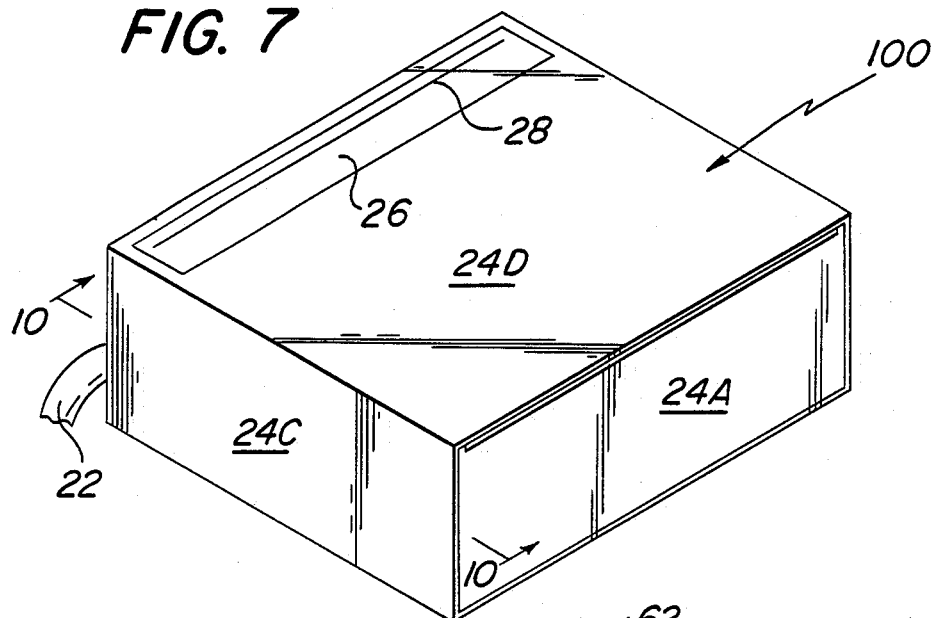
FIG. 7 is a perspective view, similar to that of FIG. 1, but showing an alternative embodiment of the invention.
Figure 8:
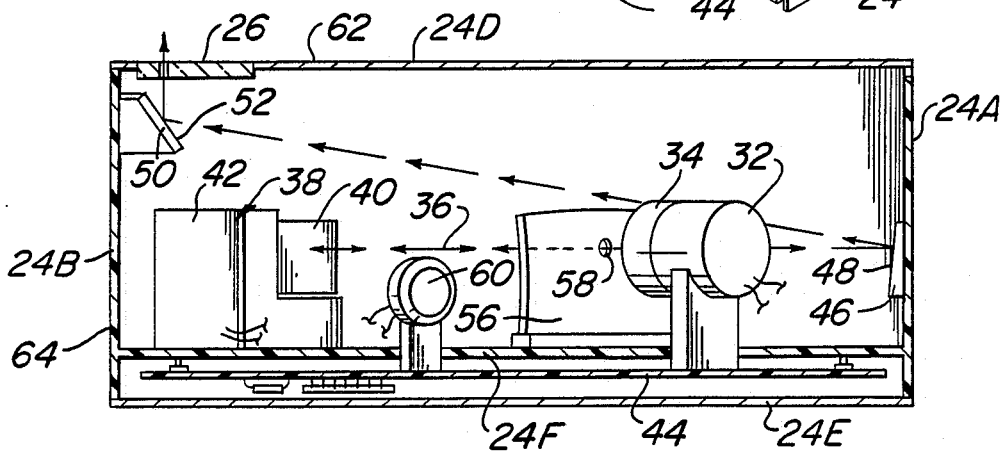
FIG. 8 is an enlarged sectional view taken along line 8—8 of FIG. 7.

In FIGS. 7 and 8 there is shown an alternative embodiment 100 of an "engine" in accordance with the teachings of this invention. In embodiment 100 the scan pattern 28 is projected vertically out of the top of the engine's housing. To accomplish that end the window 26 is located in the housing's top wall 24D adjacent its rear wall 24B. Moreover, as can be seen in FIG. 8, the mirror 50 is mounted so that its reflective surface 52 extends upward at a much more substantial angle, e.g., 45 degrees, than that of engine 20 in order to direct the swept beam out of the window 26. The other structural features of the engine 100 are the same as described with reference to engine 20, and the same reference numerals are used for all common components.

Operation of the engine 100 is similar to that of engine 20 and thus will not be reiterated herein. It should be noted, however, that the length of the path that the beam 36 takes from its origin point on mirror 40 until it exits the window 26 is shorter than that of engine 20 for the same size housing if the same beam sweep angle is used. Thus, the length of the linear pattern 28 exiting the window will be somewhat less than that of the engine 20.

Figure 9:
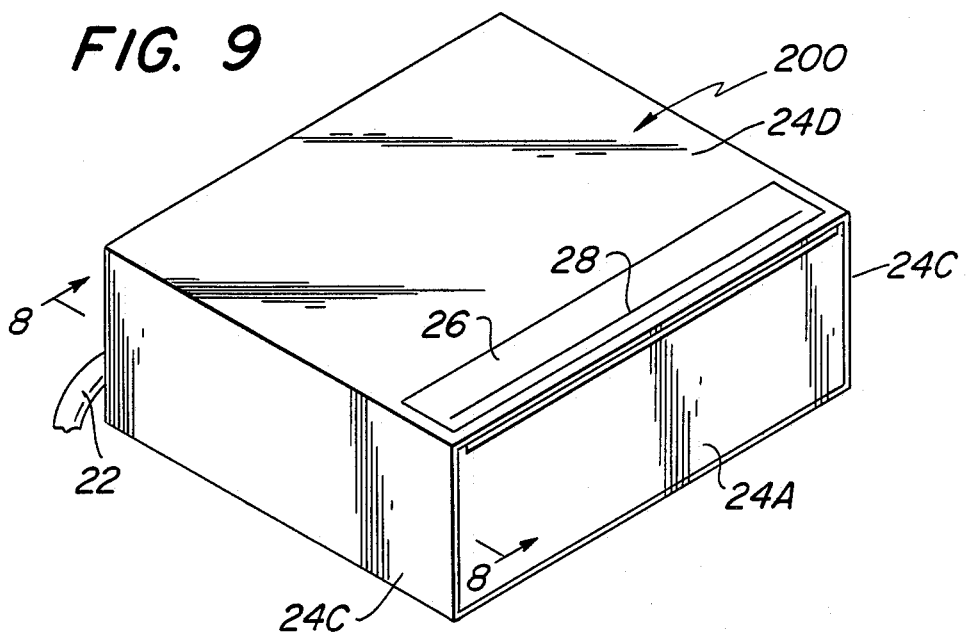
FIG. 9 is a perspective view, similar to that of FIGS. 1 and 7, but showing yet another alternative embodiment of the subject invention.
Figure 10:
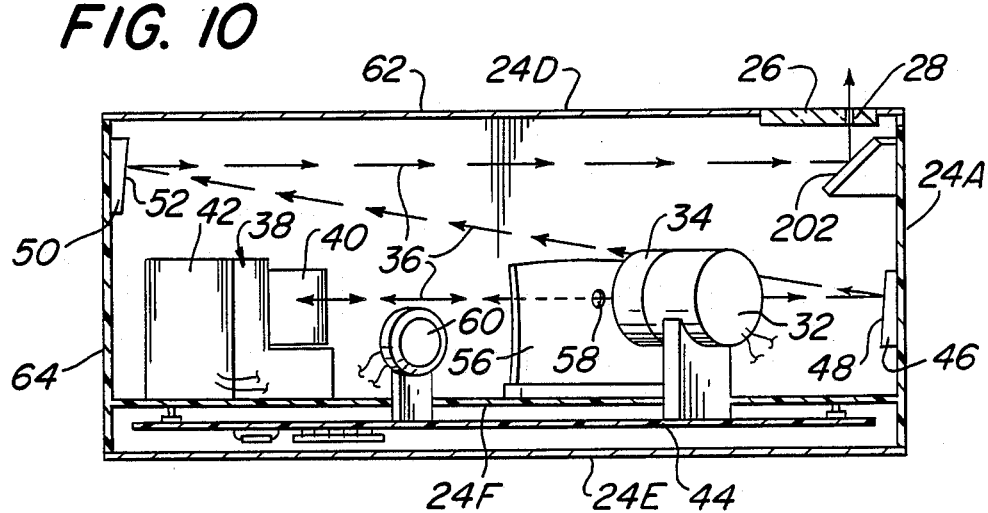
FIG. 10 is an enlarged sectional view taken along line 10—10 of FIG. 9.

In FIGS. 9 and 10 there is disclosed yet another alternative embodiment of an engine constructed in accordance with this invention. That embodiment is designated by the reference numeral 200 and, like engine 100, utilizes virtually all of the same components as in engine 20. Hence, the same reference numerals will be used for the common components. Like engine 100, engine 200 is arranged to project the scan pattern out of the top of its housing. Thus, the engine 200 includes the window 26 in its top wall 24D. However, unlike engine 100, engine 200 utilizes substantially the same beam length path as engine 20 so that the length of the linear scan pattern 28 at window 26 is virtually the full length of the window for the same size housing and beam sweep angle as engine 20. That action is accomplished through the use of an additional beam folding mirror 202. The additional mirror 202 is arranged to receive the horizontally swept beam pattern off of mirror 50 to direct it to the window 26. Thus, the mirror 202 is an elongated member having a generally planar reflecting surface 204 and is mounted on the inside surface of the front wall 24A immediately adjacent the top wall 24D so that the reflecting surface extends at approximately 45 degrees to the horizontal.

It should be pointed out at this juncture that other types of laser beam generating devices can be used in lieu of the semi-conductor laser diode described heretofore. Moreover, other beam sweeping means can be utilized to produce the scan pattern, and that pattern need not consist of only a single line.

In view of the foregoing it should be appreciated by those skilled in the art that engines constructed in accordance with the teachings of this invention can be made extremely compact in size and at a relatively low cost.

Thus, such engines can serve as low cost building blocks or modules of any type of laser scanning system.

Without further elaboration the foregoing will so fully illustrate my invention that others may, by applying current or future knowledge, readily adapt the same for use under various conditions of service.

I claim:

1. A module for use in a scanning system, said module comprising a housing comprising a front end and a rear end, said front end having a window therein, first means for sweeping a laser beam from a predetermined point within said housing through a predetermined angle to produce a swept beam scan pattern comprising at least one line, and second means for projecting said pattern out of said window, the length of said line at said window being predetermined, said swept bean forming a path through said housing, said second means being located between said first means and said window and comprising beam folding means, said beam folding means comprising first and second reflecting means, one of said reflecting means being located within said housing adjacent said window and the other of said reflecting means being located within said housing adjacent said rear end and disposed generally opposite to said first reflecting means, said first means directing said swept beam to said first reflecting means, said first reflecting means directing said swept beam to said second reflecting means, said second reflecting means directing said swept beam to said window, whereupon said beam folding means folds the path of said swept beam within said housing so that said predetermined point may be located closer to said window that if said swept beam was projected linearly through said predetermined angle from a point to said window to produce a scan line of said predetermined length at said window, thereby enabling said housing to be very compact.

2. The module of claim 1 wherein said first and second reflecting means each comprises a fixed mirror, one of said mirrors being mounted within said housing adjacent said front end and the other of said mirrors being mounted within said housing adjacent said rear end.

3. The module of claim 2 wherein said first means comprises a reflective member being arranged for reciprocating oscillation about an axis through said predetermined angle.

4. The module of claim 3 wherein said angle is approximately 14 degrees.

5. The module of claim 4 wherein the distance between said front end and said rear end of said housing is approximately 1.5 inches (3.9 cm).

6. The module of claim 2 wherein the distance between said front end and said rear end of said housing is approximately 1.5 inches (3.9 cm).

7. The module of claim 2 wherein each of said mirrors is generally planar.

8. The module of claim 1 wherein said housing comprises a front end, a rear end, and a top, said top having said window therein, said first and second reflecting means each comprising a fixed mirror, one of said mirrors being mounted within said housing adjacent said front end and the other of said mirrors being mounted within said housing adjacent said rear end.

9. The module of claim 8 wherein said first means comprises a reflective member being arranged for reciprocating oscillation about an axis through said predetermined angle.

10. The module of claim 9 wherein said angle is approximately 14 degrees.

11. The module of claim 10 wherein the distance between said front end and said rear end of said housing is approximately 1.5 inches (3.9 cm).

12. The module of claim 8 wherein the distance between said front end and said rear end of said housing is approximately 1.5 inches (3.9 cm).

13. The module of claim 8 wherein said first means comprises a reflective member being arranged for reciprocating oscillation about an axis through said predetermined angle.

14. The module of claim 13 wherein said angle is approximately 14 degrees.

15. The module of claim 13 wherein the distance between said front end and said rear end of said housing is approximately 1.5 inches (3.9 cm).

16. The module of claim 8 wherein the distance between said front end and said rear end of said housing is approximately 1.5 inches (3.9 cm).

17. The module of claim 4 wherein each of said mirrors is generally planar.

18. The module of claim 1 wherein said first means comprises a reflective member being arranged for reciprocating oscillation about an axis through said predetermined angle.

19. The module of claim 18 wherein said angle is approximately 14 degrees.

20. The module of claim 1 wherein one of said reflecting means being located at a higher elevation within said housing than the other of said reflecting means, with the higher one of said reflecting means being oriented at a slight downward angle and with the lower of said reflecting means being oriented at a slight upward angle, whereupon said beam exits said window generally horizontally with respect to said housing.

21. The module of claim 20 wherein said first means is located within said housing at approximately the same elevation as the lower of said reflecting means.

22. The module of claim 19 wherein said first means comprises a reflective member arranged for reciprocating oscillation about a vertical axis through said predetermined angle.

23. The module of claim 22 wherein said angle is approximately 14 degrees.

24. The module of claim 23 wherein the distance between said front end and said rear end of said housing is approximately 1.5 inches (3.9 cm) and wherein the height of said housing is approximately 0.75 inch (1.9 cm).

25. The module of claim 20 wherein said module additionally comprises light collection means for collecting light reflected back into said window from an object being scanned by said scan pattern, said light collecting means comprising light sensing means and convergent optic means, said convergent optic means being located within said housing at approximately the same elevation as said first means, said reflected light entering said window and reflecting off of said light folding means, said first means and said light collecting means for receipt by said light sensing means.

26. The module of claim 25 wherein housing comprises a front end and a rear end, said front end having said window therein, said first and second reflecting means each comprising a fixed mirror, one of said mirrors being mounted within said housing adjacent said front end and the other of said mirrors being mounted within said housing adjacent said rear end.

27. The module of claim 26 wherein said first means is located within said housing at approximately the same elevation as the lower of said reflecting means.

28. The module of claim 27 wherein said first means comprises a reflective member arranged for reciprocating oscillation about a vertical axis through said predetermined angle.

29. The module of claim 28 therein said angle is approximately 14 degrees.

30. The module of claim 29 wherein the distance between said front end and said rear end of said housing is approximately 1.5 inches (3.9 cm) and wherein the height of said housing is approximately 0.75 inch (1.9 cm).

31. The module of claim 26 wherein each of said mirrors is generally planar.

32. The module of claim 25 wherein said convergent optic means comprises a concave mirror.

33. The module of claim 1 wherein one of said reflecting means being located at a higher elevation within said housing than the other of said reflecting means, with the higher one of said reflecting means being oriented at a substantial upward angle and with the lower of said reflecting means being oriented at a slight upward angle, whereupon said beam exits said window generally vertically with respect to said housing.

34. The module of claim 33 wherein said first means is located within said housing at approximately the same elevation as the lower of said reflecting means.

35. The module of claim 33 wherein said first means comprises a reflective member arranged for reciprocating oscillation about a vertical axis through said predetermined angle.

36. The module of claim 35 wherein said angle is approximately 14 degrees.

37. The module of claim 36 wherein the distance between said front end and said rear end of said housing is approximately 1.5 inches (3.9 cm) and wherein the height of said housing is approximately 0.75 inch (1.9 cm).

38. The module of claim 33 wherein said module additionally comprises light collection means for collecting light reflected back into said window from an object being scanned by said scan pattern, said light collecting means comprising light sensing means and convergent optic means, said convergent optic means being located within said housing at approximately the same elevation as said first means, said reflected light entering said window and reflecting off of said light folding means, said first means and said light collecting means for receipt by said light sensing means.

39. The module of claim 38 wherein housing comprises a front end, a rear end, and a top, said top having said window therein, said first and second reflecting means each comprising a fixed mirror, one of said mirrors being mounted within said housing adjacent said front end and the other of said mirrors being mounted within said housing adjacent said rear end.

40. The module of claim 39 wherein said first means is located within said housing at approximately the same elevation as the lower of said reflecting means.

41. The module of claim 40 wherein said first means comprises a reflective member arranged for reciprocating oscillation about a vertical axis through said predetermined angle.

42. The module of claim 41 wherein said angle is approximately 14 degrees.

43. The module of claim 42 wherein the distance between said front end and said rear end of said housing is approximately 1.5 inches (3.9 cm) and wherein the height of said housing is approximately 0.75 inch (1.9 cm).

44. The module of claim 39 wherein each of said mirrors is generally planar.

45. The module of claim 38 wherein said convergent optic means comprises a concave mirror.

46. The module of claim 1 wherein said module is adapted for use in a hand-held scanning system, and wherein said housing comprises a top wall, a front wall, and a rear wall, said window being located within said front wall closely adjacent said top wall and extending substantially the width of said housing, said second means directing said pattern out of said window closely adjacent the top of said window, whereupon said housing does not interfere with the aiming of said pattern onto an object to be scanned.

47. The module of claim 46 wherein said housing is approximately 1.5 inches (3.9 cm) long, by 1.75 inches (4.44 cm) wide, by 0.75 inch (1.9 cm) high.

48. The module of claim 1 wherein said module comprises a portion of a hand-held scanning system.

49. The module of claim 48 wherein one of said reflecting means being located at a higher elevation within said housing than the other of said reflecting means, with the higher one of said reflecting means being oriented at a slight downward angle and with the lower of said reflecting means being oriented at a slight upward angle, whereupon said beam exits said window generally horizontally with respect to said housing.

50. The module of claim 49 wherein said first and second reflecting means each comprise a fixed mirror, one of said mirrors being mounted within said housing adjacent said front end and the other of said mirrors being mounted within said housing adjacent said rear end.

51. The module of claim 48 wherein one of said reflecting means being located at a higher elevation within said housing than the other of said reflecting means, with the higher one of said reflecting means being oriented at a substantial upward angle and with the lower of said reflecting means being oriented at a slight upward angle, whereupon said beam exits said window generally vertically with respect to said housing.

52. The module of claim 51 wherein housing additionally comprises a top, said top having said window therein, said first and second reflecting means each comprising a fixed mirror, one of said mirrors being mounted within said housing adjacent said front end and the other of said mirrors being mounted within said housing adjacent said rear end.

* * * * *